May 31, 1927.

H. W. BLAISDELL

FILTRATION SYSTEM

Filed April 27, 1922

1,630,371

Inventor:
Hiram W Blaisdell
by D C Stickney
Attorney

Patented May 31, 1927.

1,630,371

UNITED STATES PATENT OFFICE.

HIRAM W. BLAISDELL, OF NEW YORK, N. Y., ASSIGNOR TO THE BLAISDELL FILTRATION COMPANY, A CORPORATION OF DELAWARE.

FILTRATION SYSTEM.

Application filed April 27, 1922. Serial No. 556,993.

This invention relates to the renovation of filtration systems for municipalities and other wholesale purposes.

The water to be filtered is usually led into a basin, whose bottom consists of a filtration bed comprising a deep layer of sand. Upon the top of this bed there forms a film or schmutzdeke which may eventually clog the filter, although in many instances such a film is regarded as an advantage until it reaches the clogging condition, since the film may be itself an agent in straining out impurities and bacteria from the water.

The necessary cleaning or renovation of the bed has heretofore usually involved a great expense and delay, as it has been necessary to drain off the basin and scrape off the sand, then wash it, and finally replace the sand upon the bed.

According to the present invention, the filter bed may be renovated, or its filtering qualities restored at little or no cost, and without keeping the filter out of use except momentarily, and without requiring an auxiliary supply of filtered water.

This effect is accomplished by causing a regurgitation or surging or seeping of the water up through the bed, thus effecting such disturbance of the film or schmutzdeke that clogging thereby is greatly diminished or eliminated, and the filtering qualities of the bed are at once restored.

The water discharging from the bed is suddenly shut off, and is allowed to accumulate between the bed and the shutting-off point. This accumulation may take place in either a stand-pipe or an air chamber. The surplus of water thus accumulated is then permitted to force its way back into the bed, and to percolate or flow up therethrough, and to have such effect upon the film or schmutzdeke as to overcome its clogging condition, and the bed may be promptly used again for filtration.

As understood by those familiar with filtering of water, the schmutzdeke is a gelatinous mass in film form which accumulates and spreads over the filter sand surface, and such film is beneficial in the filtering process because the schmutzdeke film collects and destroys germs and water micro-organisms and strains them out of the water just before the water starts through the sand bed, and in fact this schmutzdeke grows by reason of its ability to destroy and retain the micro-organisms from the raw water.

Other features and advantages will hereinafter appear.

In the accompanying drawings.

Figure 1:
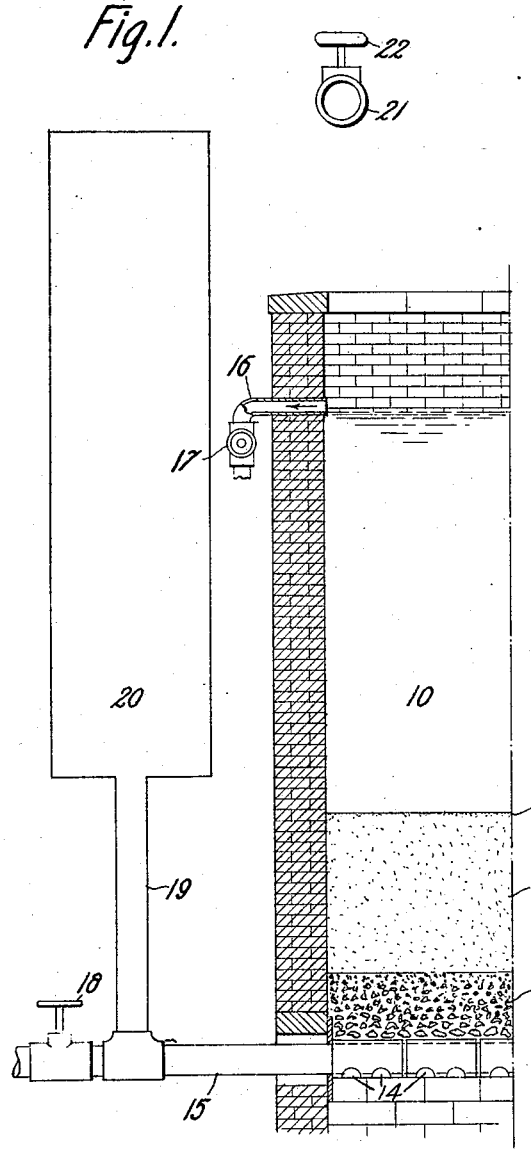
Figure 1 is a sectional diagrammatic elevation of a filter bed and apparatus connected thereto for effecting a regurgitation of the water.

The raw water to be filtered is let into a basin 10, to the depth nine feet for example. In the bottom of the basin is a layer of filtering sand 11, surmounted by a thin layer of extremely fine sand 12, as set forth in my application No. 544,159. Beneath the main sand layer 11 is a layer of gravel 13, and at the bottom of the bed are drains 14 leading to a discharge main 15 for the filtered water.

When it is desired to renovate the bed, an overflow pipe 16 may be closed by a valve 17, and then the outlet main 15 is closed by means of a valve 18. Closing of the valve 18 is effected very quickly, and the water flowing out from the basin through the main is forced up by momentum through pipe 19 and into an air chamber 20, compressing the air therein. At this time, the inlet 21 to the filtration basin may be closed by valve 22. As soon as the shock of the uprushing water has been absorbed by the body of air in the air chamber 20, the reaction of the compressed air forces the water down again through pipe 19 and back through the main 15 into the basin, where it is forced up through the gravel 13 and sand 11 and disturbs, agitates, lifts or breaks up the film or schmutzdeke. The effect of this is to overcome its clogging characteristic.

This upflow of the water through the sand is quickly accomplished, and thereupon the bed is ready for the resumption of filtration. The valve 18 in the main may be opened. The valve 17 in the overflow may be opened as soon as the water in the basin has dropped to its usual level. A supply of water may be admitted at 21 to the basin.

Figure 2:
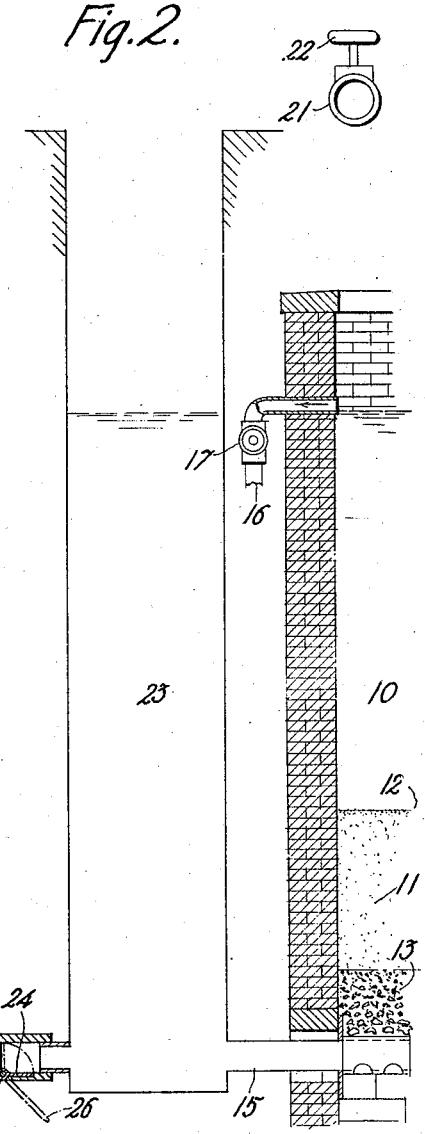
Figure 2 is a similar diagram of a filter bed having the preferred form of renovating apparatus.

In the preferred form of the invention, Figure 2, there is used a stand-pipe 23 in place of the air chamber seen in Figure 1.

The filtered water, upon the quick closing of valve 24 at Figure 2, is caused, by momentum, to rise in said stand-pipe 23; the outlet overflow valve 17 and intake 21 being closed at about this time. As soon as the water has reached a maximum height in the stand-pipe 23, it will begin to descend in said stand-pipe and to rise through the bed 11, thus breaking up or disturbing the clogging nature of the film. This process requires not more than a few minutes, whereupon the bed is again ready to filter, and the outlet valve 24 may be reopened.

As soon as the water descends to a normal level, seen at Figure 2, the overflow valve 17 may be opened and also the usual intake valve 21 for raw water.

The main valve 24 at Figure 2 may be in the nature of a throttle or disk pivoted at 25 near one edge and having a handle 26 by which the valve may be swung up from its normal open position. The effect of the pressure of water upon the partly closed valve is to drive it to its fully closed position, so that the delivery of water is suddenly arrested, and the moving water accumulates in stand-pipe 23, with the result that the water level rises considerably in said stand-pipe and increases the efficiency of the apparatus in immediately flowing back into and renovating the filter bed.

No water needs to be wasted, and the time occupied for renovation is extremely brief. It is seen that the bed is renovated by the water after it has passed down through the bed and become filtered thereby, and that the renovating apparatus is therefore self-contained and not dependent upon other water supplies.

The topmost layer of superfine sand 12 consists of such minute particles as to have the characteristic of straining out the bacteria and other foreign elements without the necessity of delaying for the film to form again. This makes it feasible to effect a substantial reduction in the area of the main and auxiliary filtration plants. Water may be passed through the filtration basin much more rapidly than is the usual practice. The sand-layer 12 may be so fine as to present the characteristic of not being penetrated by the mud which accumulates at the bottom of the body of raw water. This mud also may be freed by the described renovating upflow or reverse-flow operation, but this operation does not remove the mud from the basin.

The foreign matter which remains in the basin does not impair the efficiency of the filter, but, after many of the herein-described reverse-flow operations, such foreign matter may eventually be removed by a sand-washing machine. The reverse-flow operation, it will be understood, may be repeated as often as necessary between sand-washing operations; and its renovating action tends to get the filter bed into better and better working condition, so that the intervals of use of the sand-washing machine may be greatly prolonged.

Variations may be resorted to within the scope of the invention, and portions of the improvements may be used without others.

Having thus described my invention, I claim:

1. The process of renovating a filtration bed, comprising shutting off the outflow of water, permitting said outflowing water to accumulate between the filter bed and the shutting-off point, so that the accumulation of surplus water automatically flows back and up through the bed for the purpose specified.

2. The process of renovating a sand filtration bed, comprising shutting off the supply of raw water, permitting the level of water in the basin to be lowered beyond the overflow point, shutting off the discharge of water from the basin, and permitting the water moving down through the sand bed to rise in a stand pipe or air chamber to compress the air therein, and then automatically to react and effect a backflow into the bed and up through the same, for the purpose set forth.

3. That improved process of cleaning filter beds which consists in, permitting the outflow of water from the basin, suddenly stopping said outflow by closing a valve, resulting in an accumulation of water between the valve and basin, and which produces a head of water between said valve and basin having an overbalanced value or weight sufficient to flow back up through the sand bed.

HIRAM W. BLAISDELL.